United States Patent Office 2,773,096
Patented Dec. 4, 1956

2,773,096

N-(4-HYDROXYPHENYL)-3-PHENYL-SALICYLAMIDE

Melville Sahyun, John A. Faust, and Leonard H. Jules, Santa Barbara, Calif., assignors, by mesne assignments, to Cutter Laboratories, Inc., Berkeley, Calif., a corporation of California No Drawing. Application February 12, 1953,
Serial No. 336,646

2 Claims. (Cl. 260—559)

This invention relates to a substituted salicylamide and is more particularly concerned with N-(4-hydroxyphenyl)-3-phenylsalicylamide having the formula:

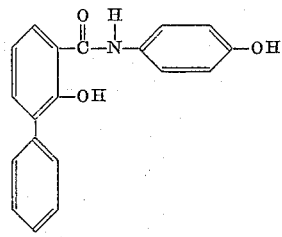

The novel compound of the present invention has particular activity as a fungicidal agent and as a central nervous system depressant, being distinguished by its low toxicity, indicating utility as an analgesic, as well as being an intermediate in the preparation of more complex organic molecules.

The novel compound of the present invention may be prepared by an intermediate preparation of phenyl-3-phenylsalicylate and a subsequent condensation of this material with 4-aminophenol. Condensation is readily accomplished by heating the materials together at a temperature between about 50 and about 250 degrees centigrade, preferably between about 180 and 220 degrees centigrade. Separation in conventional manner will yield the desired product.

PREPARATION.—PHENYL 3-PHENYLSALICYLATE

A mixture of 128.5 grams (0.6 mole) of 3-phenylsalicylic acid, 56.5 grams (0.6 mole) of phenol, and 30.7 grams (0.2 mole) of phosphorous oxychloride was heated at 110–120 degrees centigrade for about one and a half hours whence the evolution of hydrogen chloride has ceased. The hot liquid reaction mixture was poured into 500 milliliters of water and stirred until the oil solidified. The solid was isolated, washed with water, and digested in warm dilute sodium carbonate solution. The mixture was filtered and the orange solid was purified by two recrystallizations from isopropanol. There was thus obtained 104.5 grams (60 percent of the theoretical yield) of phenyl 3-phenylsalicylate, having a melting point of 95–96 degrees centigrade.

*Example.—N-(4-hydroxyphenyl)-3-phenylsalicylamide*

A mixture of 174.2 grams (0.6 mole) of phenyl 3-phenylsalicylate and 87.3 grams (0.8 mole) of 4-aminophenol was heated at 200–210 degrees centigrade for five hours. After removal of phenol by distillation under reduced pressure, the dark solid mass was dissolved in a mixture of 300 milliliters of acetone and 600 milliliters of isopropanol and the resulting solution acidified with approximately 100 milliliters of ten percent aqueous hydrochloric acid. The warm dark solution was treated with carbon, filtered, and the filtrate diluted with 700 milliliters of water. The solid which separated was isolated and recrystallized from a mixture of 1.0 liter of isopropanol and 300 milliliters of water. Subsequent crystallization from a mixture of 500 milliliters of methanol and 200 milliliters of water containing a small quantity of ascorbic acid yielded 124.5 grams (68 percent of the theoretical yield) of pale tan crystals melting at 183–184 degrees centigrade. This material was N-(4-hydroxyphenyl)-3-phenylsalicylamide, insoluble in water, slightly soluble in propylene glycol and soluble in a strong sodium hydroxide solution.

*Analysis.*—Calculated: N, 4.59. Found: N, 4.65.

Various modifications may be made in the method of the present invention without departing from the spirit or scope thereof and it is to be understood that we limit ourselves only as defined in the appended claims.

We claim:

1. N-(4-hydroxyphenyl)-3-phenylsalicylamide having the formula:

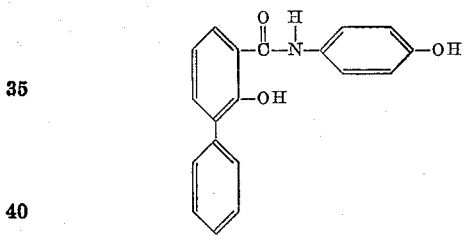

2. The process which comprises: heating approximately equimolecular quantities of phenyl 3-phenylsalicylate and 4-aminophenol at a temperature between about 50 and about 250 degrees centigrade, and separating the N-(4-hydroxyphenyl)-3-phenylsalicylamide thus formed.

References Cited in the file of this patent

UNITED STATES PATENTS

| | | |
|---|---|---|
| 2,179,239 | Wilmanns et al. | Nov. 7, 1939 |
| 2,376,743 | Wendt | May 22, 1945 |

OTHER REFERENCES

Van Allan: "JACS," vol. 69 (1947), pp. 2913–14.
Fargher et al.: "J. Textile Inst.," vol. 21 (1930), pp. 1247, 1255.
Chem. Abst., vol. 32 (1938), page 7907.